(12) United States Patent
Yates et al.

(10) Patent No.: US 10,544,605 B2
(45) Date of Patent: Jan. 28, 2020

(54) SLIDING LOCKABLE HOUSING WITH SUPPLEMENTAL OPENINGS

(71) Applicants: Douglas A. Yates, Spicewood, TX (US); Edward J. Gross, Austin, TX (US); Steven R. Jones, Spicewood, TX (US); Kevin Keller, Austin, TX (US)

(72) Inventors: Douglas A. Yates, Spicewood, TX (US); Edward J. Gross, Austin, TX (US); Steven R. Jones, Spicewood, TX (US); Kevin Keller, Austin, TX (US)

(*) Notice: Subject to any disclaimer, the term of this patent is extended or adjusted under 35 U.S.C. 154(b) by 62 days.

(21) Appl. No.: 15/984,283

(22) Filed: May 18, 2018

(65) Prior Publication Data

US 2018/0334834 A1 Nov. 22, 2018

Related U.S. Application Data

(60) Provisional application No. 62/508,985, filed on May 19, 2017.

(51) Int. Cl.
*E05B 73/00* (2006.01)
*B60D 1/60* (2006.01)
*E05B 67/38* (2006.01)

(52) U.S. Cl.
CPC ............. *E05B 73/00* (2013.01); *B60D 1/60* (2013.01); *E05B 67/383* (2013.01); *E05B 73/0005* (2013.01)

(58) Field of Classification Search
CPC .... E05B 73/00; E05B 67/383; E05B 73/0005; B60D 1/60

(Continued)

(56) References Cited

U.S. PATENT DOCUMENTS 2,963,895 A * 12/1960 Thomas ............... E05B 67/383
70/14
3,754,419 A 8/1973 Taylor
(Continued)

FOREIGN PATENT DOCUMENTS

CN 103896122 A 7/2014
EP 2299251 A1 3/2011
(Continued)

OTHER PUBLICATIONS

USPTO as International Searching Authority (ISA); International Search Report and Written Opinion of the ISA; pp. 1-12; dated Jun. 6, 2017 (Jun. 6, 2017) (USPTO Alexandria, Virginia US).

(Continued)

*Primary Examiner* — Lloyd A Gall
(74) *Attorney, Agent, or Firm* — Culhane Meadows PLLC (57) ABSTRACT

Described herein is a lockable housing having a base portion and a mated sliding portion. In particular embodiments, the base portion supports a shaft with a free end that is received into the sliding portion when the housing is closed. The housing may include one or more spacers sized for releasable placement around the shaft, thereby reducing the open area near the shaft and increasing security. The housing features a shackle window for receiving a locking element such as a padlock. The housing also features one or more supplemental openings for receiving a secondary element such as a cable that can be used to secure other items or equipment when the housing is closed and locked.

8 Claims, 5 Drawing Sheets

(58) Field of Classification Search
USPC ........ 70/30, 49, 233, 14, 18, 19, 52, 53, 58, 70/20, 25, 26, 38 R, 38 B, 38 C, 39; 292/256, 258, 288, 292, 295
See application file for complete search history.

(56) References Cited

U.S. PATENT DOCUMENTS

| | | | |
|---|---|---|---|
| 4,027,276 A | 5/1977 | Shaughnessy | |
| 4,032,848 A | 6/1977 | Shaughnessy | |
| 4,095,211 A | 6/1978 | Shaughnessy | |
| 4,188,614 A | 2/1980 | Habib, Jr. | |
| 4,229,811 A | 10/1980 | Salem | |
| 4,242,743 A | 12/1980 | Salem | |
| 4,260,928 A | 4/1981 | Salem | |
| 4,531,115 A | 7/1985 | Black et al. | |
| 4,538,107 A | 8/1985 | Varone | |
| 4,576,022 A | 3/1986 | Gamble | |
| 4,626,799 A | 12/1986 | Matievic | |
| 4,672,365 A | 6/1987 | Gehman et al. | |
| 4,682,155 A | 7/1987 | Shirley | |
| 4,734,680 A | 3/1988 | Gehman et al. | |
| 4,737,771 A | 4/1988 | Coash | |
| 4,755,792 A | 7/1988 | Pezzolo et al. | |
| 5,066,943 A | 11/1991 | Demirel | |
| 5,268,670 A | 12/1993 | Brasch et al. | |
| 5,477,152 A | 12/1995 | Hayhurst | |
| 5,699,065 A | 12/1997 | Murray | |
| D391,469 S | 3/1998 | Foushee | |
| 5,852,402 A | 12/1998 | Perry | |
| 5,881,582 A * | 3/1999 | Monaco | E05B 67/383 70/14 |
| 5,898,397 A | 4/1999 | Murray | |
| 5,959,532 A | 9/1999 | Fujiuchi et al. | |
| 6,166,644 A | 12/2000 | Stroda | |
| 6,439,008 B1 | 8/2002 | Keil | |
| 6,570,498 B1 | 5/2003 | Frost et al. | |
| 6,578,393 B2 | 6/2003 | Yarborought | |
| 6,684,668 B1 | 2/2004 | Hsueh Lee | |
| 6,720,861 B1 | 4/2004 | Rodenbeck et al. | |
| 6,731,908 B2 | 5/2004 | Berliner et al. | |
| 6,859,761 B2 | 2/2005 | Bensky et al. | |
| 6,961,541 B2 | 11/2005 | Overy et al. | |
| 6,963,289 B2 | 11/2005 | Aljadeff et al. | |
| 6,968,194 B2 | 11/2005 | Aljadeff et al. | |
| D523,729 S | 6/2006 | Gorst | |
| D527,296 S | 8/2006 | Concari | |
| 7,104,091 B2 | 9/2006 | Kuhblank | |
| 7,123,030 B2 | 10/2006 | Robar et al. | |
| 7,155,783 B2 | 1/2007 | Nessel et al. | |
| 7,178,205 B2 | 2/2007 | Nessel et al. | |
| D539,181 S | 3/2007 | Concari | |
| D545,710 S | 7/2007 | Concari | |
| D545,760 S | 7/2007 | Concari | |
| 7,253,733 B2 | 8/2007 | Krieger | |
| 7,274,293 B2 | 9/2007 | Bradus et al. | |
| 7,295,115 B2 | 11/2007 | Aljadeff et al. | |
| 7,296,447 B2 | 11/2007 | Priest et al. | |
| 7,308,809 B2 * | 12/2007 | Lu | E05B 73/0082 70/14 |
| 7,319,395 B2 | 1/2008 | Puzio et al. | |
| 7,319,398 B2 | 1/2008 | Marino | |
| 7,337,963 B2 | 3/2008 | Harper et al. | |
| 7,339,475 B2 | 3/2008 | Concari et al. | |
| 7,339,477 B2 | 3/2008 | Puzio et al. | |
| 7,343,328 B1 | 3/2008 | Smith et al. | |
| 7,391,315 B2 | 6/2008 | Friar | |
| 7,391,326 B2 | 6/2008 | Puzio et al. | |
| 7,392,673 B2 * | 7/2008 | Fawcett | A47F 5/0861 211/7 |
| 7,403,108 B2 | 7/2008 | Aljadeff et al. | |
| D581,303 S | 11/2008 | Concari | |
| 7,454,826 B2 | 11/2008 | Nessel et al. | |
| 7,525,411 B2 | 4/2009 | Strader et al. | |
| 7,543,467 B2 | 6/2009 | Sheehan | |
| 7,648,065 B2 | 1/2010 | Marino | |
| 7,649,464 B2 | 1/2010 | Puzio et al. | |
| 7,665,289 B2 | 2/2010 | DeAngelis | |
| 7,669,765 B2 | 3/2010 | Harper et al. | |
| 7,675,413 B2 | 3/2010 | Watts et al. | |
| 7,692,542 B2 | 4/2010 | Outzs | |
| 7,750,811 B2 | 7/2010 | Puzio et al. | |
| 7,753,272 B2 | 7/2010 | Harper et al. | |
| 7,832,064 B2 | 11/2010 | Nessel et al. | |
| 7,866,245 B2 | 1/2011 | Kempf et al. | |
| 7,916,036 B1 | 3/2011 | Pope et al. | |
| 7,926,215 B2 | 4/2011 | Riker et al. | |
| 7,961,088 B2 | 6/2011 | Watts et al. | |
| D640,911 S | 7/2011 | Yang | |
| D642,119 S | 7/2011 | Baetica et al. | |
| 7,986,228 B2 | 7/2011 | Friar et al. | |
| 8,002,180 B2 | 8/2011 | Harper et al. | |
| 8,056,945 B2 * | 11/2011 | Moreno | E05B 39/00 292/259 R |
| 8,103,047 B1 | 1/2012 | Griess et al. | |
| 8,218,810 B1 | 7/2012 | Griess et al. | |
| 8,248,226 B2 | 8/2012 | Fiar | |
| 8,264,322 B2 | 9/2012 | Rodenbeck et al. | |
| 8,313,024 B2 | 11/2012 | Marino | |
| 8,358,198 B2 | 1/2013 | Harper et al. | |
| 8,360,208 B2 | 1/2013 | DeAngelis | |
| 8,531,286 B2 | 9/2013 | Friar et al. | |
| 8,665,064 B1 | 3/2014 | Rodenbeck et al. | |
| 8,707,745 B2 * | 4/2014 | Kalous | B62D 33/037 280/507 |
| 8,746,074 B2 | 6/2014 | Lambert | |
| 8,839,649 B1 * | 9/2014 | Miller | H01H 9/282 70/14 |
| 8,850,858 B2 | 10/2014 | Nave | |
| 8,870,078 B2 | 10/2014 | Webb et al. | |
| D719,012 S | 12/2014 | Alexander | |
| 8,928,463 B2 | 1/2015 | Landau et al. | |
| D731,873 S | 6/2015 | Harder | |
| 9,089,952 B2 | 7/2015 | Gatling et al. | |
| 9,115,511 B1 | 8/2015 | Schmidt et al. | |
| 9,189,663 B2 | 11/2015 | Goren et al. | |
| 9,390,572 B2 | 7/2016 | Almomani | |
| 9,406,181 B2 | 8/2016 | Almomani | |
| 9,424,700 B2 | 8/2016 | Lovett et al. | |
| 9,449,268 B2 | 9/2016 | Goren et al. | |
| 9,547,965 B2 | 1/2017 | Goren et al. | |
| 9,633,551 B2 | 4/2017 | Aljadeff et al. | |
| 9,639,722 B2 | 5/2017 | Landau et al. | |
| 9,672,708 B2 | 6/2017 | Goren et al. | |
| 9,691,207 B2 | 6/2017 | Almomani | |
| 9,697,302 B2 | 7/2017 | Nguyen et al. | |
| 2003/0228846 A1 | 12/2003 | Berliner et al. | |
| 2004/0066202 A1 | 4/2004 | Pereira et al. | |
| 2004/0083776 A1 * | 5/2004 | Rosenberg | B62D 53/085 70/14 |
| 2004/0119583 A1 | 6/2004 | Linden et al. | |
| 2005/0079756 A1 | 4/2005 | Kawai et al. | |
| 2005/0116120 A1 | 6/2005 | Maruyama | |
| 2005/0242246 A1 | 11/2005 | Maruyama | |
| 2006/0109103 A1 | 5/2006 | Bradus | |
| 2006/0123229 A1 | 6/2006 | Holloway et al. | |
| 2006/0139861 A1 | 6/2006 | Krieger et al. | |
| 2006/0272365 A1 * | 12/2006 | Copus | E05B 13/002 70/14 |
| 2006/0283216 A1 | 12/2006 | Marcelle et al. | |
| 2007/0262853 A1 | 11/2007 | Bradus et al. | |
| 2008/0034817 A1 * | 2/2008 | Chan | E05B 73/0082 70/58 |
| 2008/0068159 A1 | 3/2008 | Bradus et al. | |
| 2008/0126126 A1 | 5/2008 | Ballai | |
| 2008/0242945 A1 | 10/2008 | Gugliotti et al. | |
| 2009/0033491 A1 | 2/2009 | Saunders | |
| 2009/0102610 A1 | 4/2009 | Lance | |
| 2009/0160427 A1 | 6/2009 | Drake et al. | |
| 2009/0236486 A1 | 9/2009 | Matsuno et al. | |
| 2009/0273465 A1 | 11/2009 | Shamir et al. | |
| 2010/0033325 A1 | 2/2010 | Vilkomirski et al. | |
| 2011/0195701 A1 | 8/2011 | Cook et al. | |
| 2011/0203327 A1 * | 8/2011 | Fong | E05B 67/383 70/14 |

(56) References Cited

U.S. PATENT DOCUMENTS

| | | | |
|---|---|---|---|
| 2011/0203329 A1* | 8/2011 | Fong | A44B 11/2576 70/58 |
| 2011/0283753 A1* | 11/2011 | Triffle | E05B 67/383 70/53 |
| 2014/0020295 A1 | 1/2014 | Bonahoom et al. | |
| 2014/0113563 A1 | 4/2014 | Almomani et al. | |
| 2014/0157842 A1 | 6/2014 | Almomani et al. | |
| 2014/0176305 A1 | 6/2014 | Aljadeff | |
| 2014/0267740 A1 | 9/2014 | Almomani et al. | |
| 2015/0091696 A1 | 4/2015 | Fisher | |
| 2015/0197408 A1 | 7/2015 | St. Germain | |
| 2016/0110637 A1 | 4/2016 | Lehovetzki | |
| 2016/0117899 A1 | 4/2016 | Chevalier et al. | |
| 2016/0140432 A1 | 5/2016 | Lehovetzki | |
| 2017/0098335 A1 | 4/2017 | Payack, Jr. | |
| 2017/0206385 A1 | 7/2017 | Barney | |

FOREIGN PATENT DOCUMENTS

| | | |
|---|---|---|
| WO | WO 2005/028790 A1 | 3/2005 |
| WO | WO 2014/012564 A1 | 1/2014 |
| WO | WO 2014/012677 A1 | 1/2014 |
| WO | WO 2017/123949 A1 | 7/2017 |

OTHER PUBLICATIONS

Attorney for Go Lock Technology, Inc.; Amendments under Article 34; total of 14 pages; submitted in International Application PCT/US2017/018215 "Portable Lock with Integrity Sensors" on Sep. 15, 2017 (Sep. 15, 2017) (USPTO Alexandria Virginia US).

USPTO as International Searching Authority (ISA); International Preliminary Report on Patentability; pp. 1-4; dated Feb. 5, 2018 (Feb. 5, 2018) (USPTO Alexandria Virginia US).

USPTO as International Searching Authority (ISA); International Search Report and Written Opinion of the ISA; pp. 1-8; dated Mar. 26, 2018 (Mar. 26, 2018) (USPTO Alexandria, Virginia US).

USPTO; Office Action (non-final); issued for U.S. Appl. No. 29/589,832, filed by Keller et al.; submitting cover page, Office Action Summary, Detailed Action, and Notice of References Cited; total of 5 pages; -elevant passages include those on pp. 3-4; dated Nov. 1, 2017 (Nov. 1, 2017) (USPTO Alexandria, Virginia).

Attorney for Keller et al.; Amendment and Response to Office Action; total of 6 pages; relevant passages include those on pp. 2-6; submitted in U.S. Appl. No. 29/589,832 dated Jan. 26, 2018 (Jan. 26, 2018) (USPTO Alexandria, Virginia).

USPTO; Notice of Allowance; issued for U.S. Appl. No. 29/589,832, filed by Keller et al.; submitting Notice of Allowance and Fee(s) Due and Notice of Allowability for Design Application; total of 6 pages; relevant passages include those on pp. 5-6; dated Feb. 26, 2018 (Feb. 26, 2018) (USPTO Alexandria, Virginia).

CIPO (Canada Intellectual Property Office); Examiner's Report; issued for Canada Application 175,754; total of 2 pages; relevant passages include those on pp. 1-2; dated Feb. 20, 2018 (Feb. 20, 2018) (CIPO Gaineau, Québec, Canada).

Attorney for Go Lock Technology, Inc.; Letter with amendments; total of 12 pages; relevant passages include those on pp. 1-12; submitted in Canada Application 175,754 on Apr. 15, 2018 (May 14, 2018) (CIPO Gaineau, Québec, Canada).

Attorney for Keller et al.; Preliminary Amendment; total of 16 pages; submitted in U.S. Appl. No. 29/648,661 (a continuation of U.S. Appl. No. 29/589,832) dated May 23, 2018 (May 23, 2018) (USPTO Alexandria, Virginia).

DeWalt DS500S MobileLock Portable Alarm with GPS, "Product & Accessories," archived webpage at http://www.DeWaltMobileLock.com:80/product -overview-and-specs, dated Nov. 8, 2014 (Nov. 8, 2014) captured via Internet Archive (https://web.archive.org).

DeWalt MobileLock "Portable Alarm Features," archived webpage at http://www.DeWaltMobileLock.com:80/product-portable-alarm-features, dated Nov. 19, 2014 (Nov. 19, 2014) captured via Internet Archive (https://web.archive.org).

\* cited by examiner

FIG. 7

SLIDING LOCKABLE HOUSING WITH SUPPLEMENTAL OPENINGS

CROSS-REFERENCE TO RELATED APPLICATIONS

The present application claims the benefit of and priority to U.S. Provisional Application 62/508,985, filed May 19, 2017, and entitled "Sliding Lock Housing with Supplemental Openings," which is incorporated herein by reference in its entirety.

BACKGROUND

Certain disclosed embodiments relate to the field of portable lock assemblies and, more specifically, to a two-part lockable housing defining a number of openings therethrough and having a main shank for securing an item of personal property.

Most existing lock assemblies for relatively large items such as trailers, trailer couplers, large coolers, tanks, and industrial equipment are sized and shaped to fit the particular item. For example, a trailer coupler lock may be shaped to fit around a ball coupler, a square tubing hitch, or another type of hitch. In practice, therefore, a custom-shaped lock assembly may only fit around one particular item or type of equipment.

Moreover, the width of the opening for the main pin or shank may be too narrow for some items and too wide for others. A narrower opening prohibits use of a lock assembly on larger items. A wider opening may be used on smaller items, but the wider opening often leaves the shank exposed and vulnerable to bolt cutters, saws, or other devices used by unauthorized persons to open the lock.

Most existing lock assemblies also include a built-in keyed lock, which represents the only way of securing the lock assembly in place. A keyed lock requires maintaining the keyway and internal mechanisms, which are often exposed to harsh environments, and further requires keeping track of another set of keys.

Thus, there is a need in the art for improved lockable housings.

SUMMARY

A lockable housing apparatus is described. According to various embodiments, a lockable housing includes a base portion comprising a front panel and an opposing rear panel separated by a fixed spacer one or more guide pins, the panels defining an interior space that is sized and shaped to slidably receive a sliding portion. Each of the front panel and the rear panel define a plurality of base openings that are sized, shaped, and positioned to correspond to one another. The base openings including a shackle opening, a supplemental opening, and a shank window. The base portion further includes a shank extending into the shank window, the shank having a free end and a fixed end connected to the base portion. The sliding portion defines a hole that is sized and shaped to slidably engage with the shank, a mated opening that is sized and shaped to receive the free end of the shank, and one or more pinways that are sized and shaped to slidably engage with the one or more guide pins. The sliding portion also defines a plurality of secondary openings each of which is sized, shaped, and positioned to correspond to the base openings when the sliding portion is mated with the base portion. The shank has a length sufficient to span the shank window and enter the mated opening when the sliding portion is mated with the base portion.

The base portion may be secured to the sliding portion either when a first element is secured through the shackle opening or when a second element is secured through the supplemental opening.

The shank window may be generally rectangular in shape, having an open width along a first axis extending generally parallel to the shank and an open depth. The lockable housing may further include a removable spacer defining a spacer opening that is sized and shaped to receive the shank.

The removable spacer may include a plurality of incremental spacers each of which is similarly sized and shaped and configured to engage with one another in a stack positioned along the shank. The incremental spacers cooperate to define an open space that is smaller in area than the shank window.

The first element may be a padlock having a body and a shackle, wherein the shackle opening is sized and shaped to receive the shackle.

The second element may be a large padlock having a large body and a large shackle, wherein the supplemental opening is sized and shaped to receive the large shackle.

The supplemental opening may be generally rectangular and may be sized shaped to receive a second element, wherein the second element is one or more devices selected from the group consisting of cable, chain, rope, wire, cord, line, tape, string, and strap.

The removable spacer may define an arcuate groove that is sized and shaped to engage with a raised rim around the hole of the sliding portion.

BRIEF DESCRIPTION OF THE DRAWING

Features of the various embodiments and other advantages will become more apparent from the following detailed description, in which reference is made to the appended drawing figures, in which.

Corresponding reference numbers indicate corresponding parts or elements throughout the several views of the drawing.

DETAILED DESCRIPTION

The present systems and apparatuses and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Like parts are marked throughout the following description and drawings with the same reference numerals. The drawings may not be to-scale and certain features may be shown exaggerated in scale or in somewhat schematic format in the interest of clarity, conciseness, and to convey information.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not. As used herein, the term "facilitate" means to make easier or less difficult. The term "impede" means to interfere with, delay the progress of, or otherwise hinder.

LOCKABLE HOUSING

Although many of the systems and methods described herein are discussed in the context of a portable lockable housing for securing personal property, the technology disclosed herein is also useful and applicable in a variety of other contexts.

Figure 1:
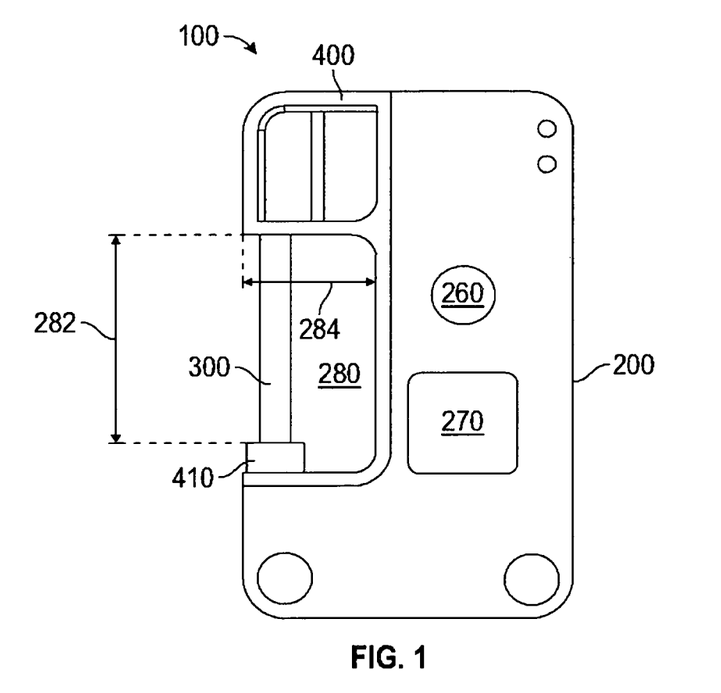
FIG. 1 is a side illustration of a lockable housing in its closed position, according to a particular embodiment.

FIG. 1 is a side illustration of a lockable housing 100 in its closed position, according to a particular embodiment. As shown, the lockable housing 100 includes a base portion 200 mated to and engaged with a sliding portion 400. The base portion 200 includes a shackle or shank 300 which, in the embodiment shown, may be generally elongate and round in cross-section. The housing 100 defines a plurality of base openings—including a shackle opening 260, a supplemental opening 270, and a shank window 280. The shank window 280 may be generally rectangular in shape, having an open width 282 as measured along a first axis that extends generally parallel to the shank 300, and an open depth 284. The lockable housing 100 may include a wireless transceiver configured to communicate with other housings and/or one or more remote computing devices such as a smartphone or personal computer.

Figure 6:
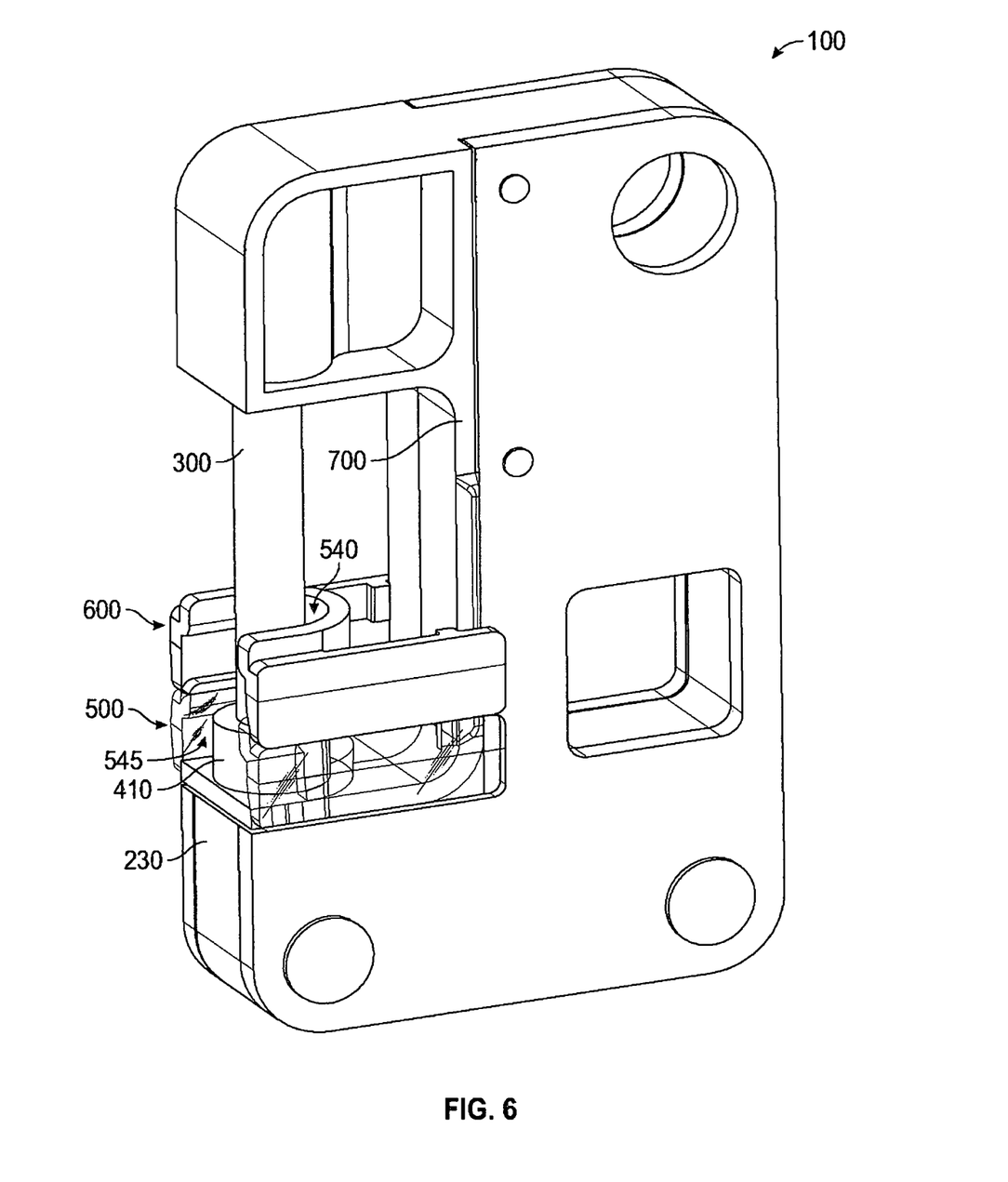
FIG. 6 is a perspective illustration of a lockable housing with spacers, according to another embodiment.

The openings 260, 270 and the shank window 280 may be located at any of a variety of locations around the lockable housing 100 in order to meet a particular need. For example, the shackle opening 260 in FIG. 1 is shown at a generally central location, where as the shackle opening 260 in FIG. 6 is shown near the upper right corner of the lockable housing 100. In addition, for the embodiment shown in FIG. 6, the one or more guide pins 240, and the pinway 440 along which they slide, may be located near the center of the lockable housing 100. In contrast, the pinway 440 is located near the right edge for the embodiment shown in FIG. 3 and FIG. 7.

The lockable housing 100 and its various components may be made of almost any material that is suitable for the expected environment where the lockable housing 100 will be used. For example, the lockable housing 100 may be made of a metal such as steel or aluminum, a tough molded plastic, a thermoplastic polymer such as ABS (acrylonitrile butadiene styrene), or another polycarbonate that may include glass fibers for strength. The various components may be made of different materials. For example, the base portion 200 may be made of metal and the sliding portion 400 may be made of polycarbonate.

Figure 5:
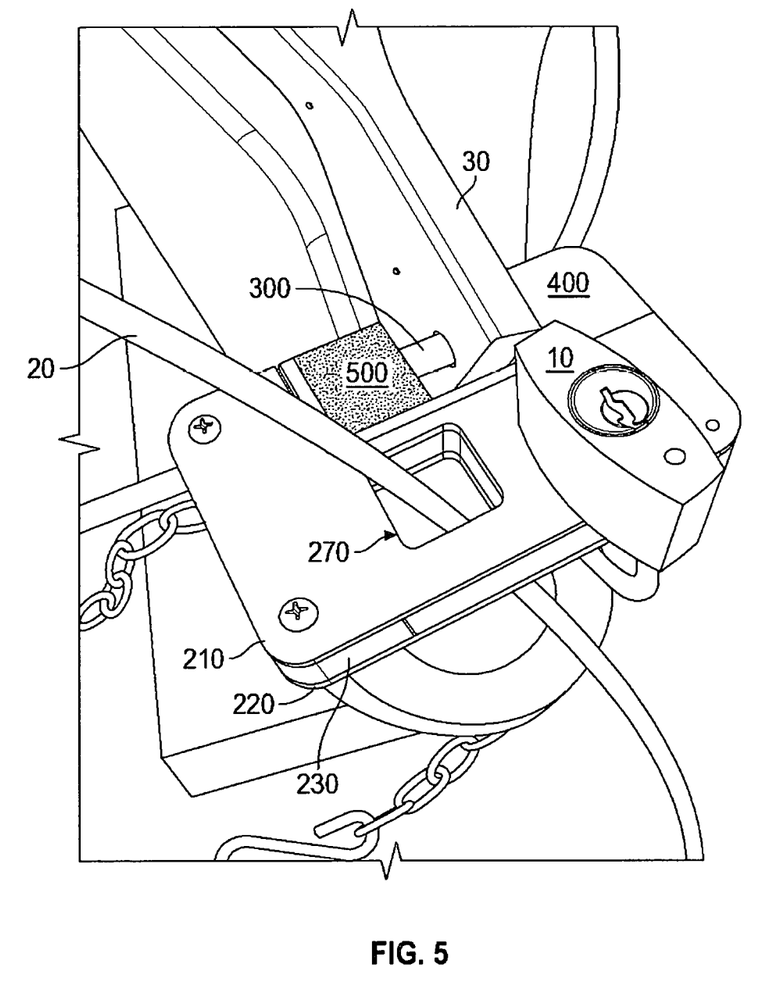
FIG. 5 is a perspective illustration of the lockable housing secured by a padlock to a trailer coupler and further showing a cable passing through a supplemental opening.

When closed, the lockable housing 100 may be restrained or locked by positioning and securing an item through one or more of the openings 260, 270 or through the shank window 280. For example, FIG. 5 illustrates a lockable housing 100 with its shank 300 passing through an opening in a personal item or piece of equipment (such as the trailer coupler 30 shown in the illustration). As shown, a first element 10, such as the shackle of a conventional padlock, may be passed through the shackle opening 260, thereby impeding the lockable housing 100 from opening—which in turn, secures the lockable housing 100 to the coupler 30. In addition, a second element 20 (for example, a cable, chain, wire, or rope) may be passed through the supplemental opening 270 and attached to additional items or equipment. In this configuration, the padlock 10 in the shackle opening 260 also secures the secondary item 20 to the lockable housing 100. In this aspect, the shackle opening 260 may be used to receive a first element 10 (such as a padlock) for securing a first element of personal property (such as a trailer), and the supplemental opening 270 may be used to receive a second element 20 (such as a cable) for securing one or more second elements of personal property (such as equipment stored on or near the trailer).

Figure 2:
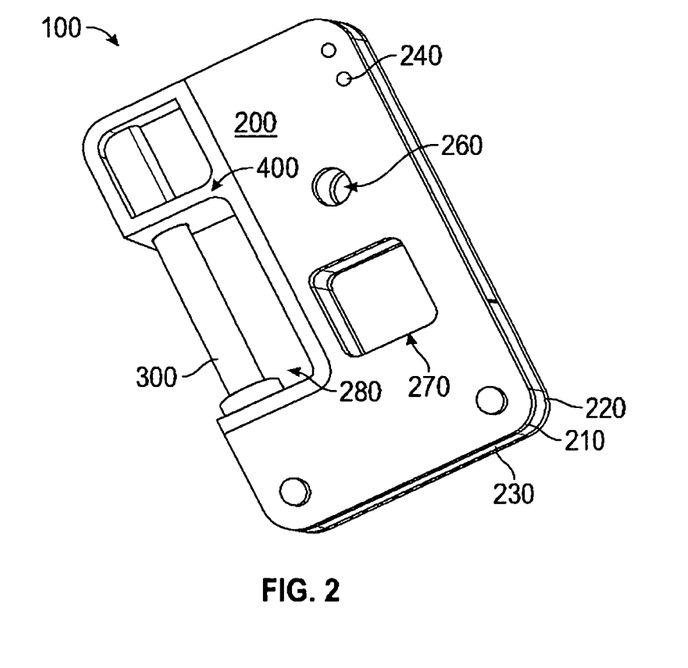
FIG. 2 is a perspective illustration of the lockable housing in its closed position.
Figure 7:
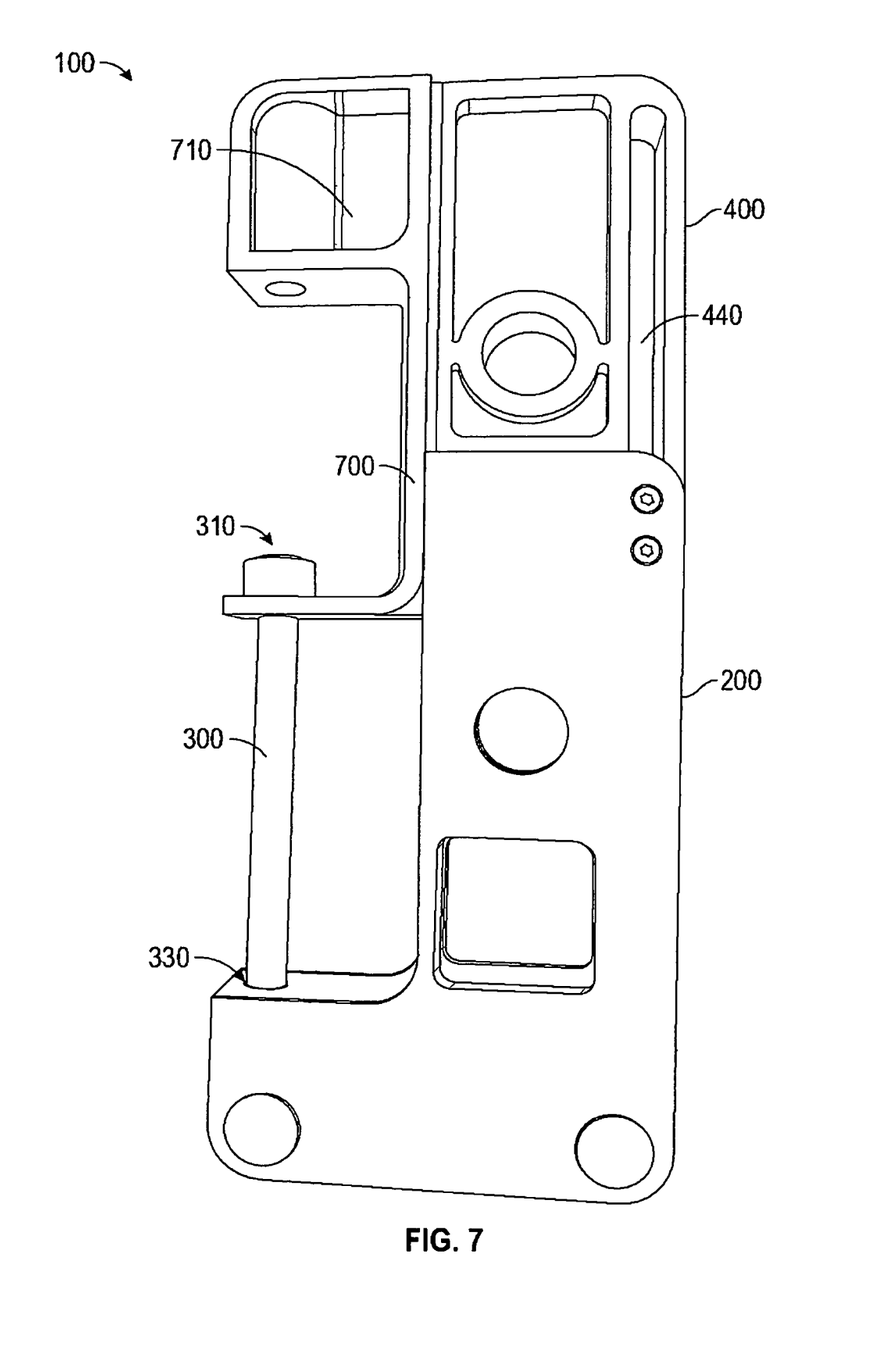
FIG. 7 is a perspective illustration a lockable housing in its open position.

FIG. 2 is a perspective illustration of the lockable housing 100 in its closed position. The base portion 200 includes a front panel 210 and an opposing rear panel 220 separated by a fixed spacer 230 (also shown in FIG. 5 and FIG. 6). The panels 210, 220 define an interior space between them that is sized and shaped to slidably receive the sliding portion 400. The fixed spacer 230 has a first thickness. The panels 210, 220 may be secured around and to the fixed spacer 230 by one or more bolts or other fasteners, as shown in the figures. The base portion 200 also features one or more guide pins 240 positioned between and attached to the panels 210, 220. The one or more guide pins 240 connect to and secures the panels 210, 220 to one another. The sliding portion 400 may include a pinway 440, as shown in FIG. 3 and FIG. 7, that is sized and shaped to slidably engage with the one or more guide pins 240 in order to maintain alignment between the base portion 200 and the sliding portion 400 when sliding the housing 100 open or closed.

The sliding portion 400, as shown, also defines a plurality of secondary openings that are positioned, sized, and shaped to correspond to the shackle opening 260, the supplemental opening 270, and the shank window 280 defined by the base portion 200. In this aspect, it may be understood that the openings 260, 270 and window 280 are defined by both the base portion 200 and the sliding portion 400.

Figure 3:
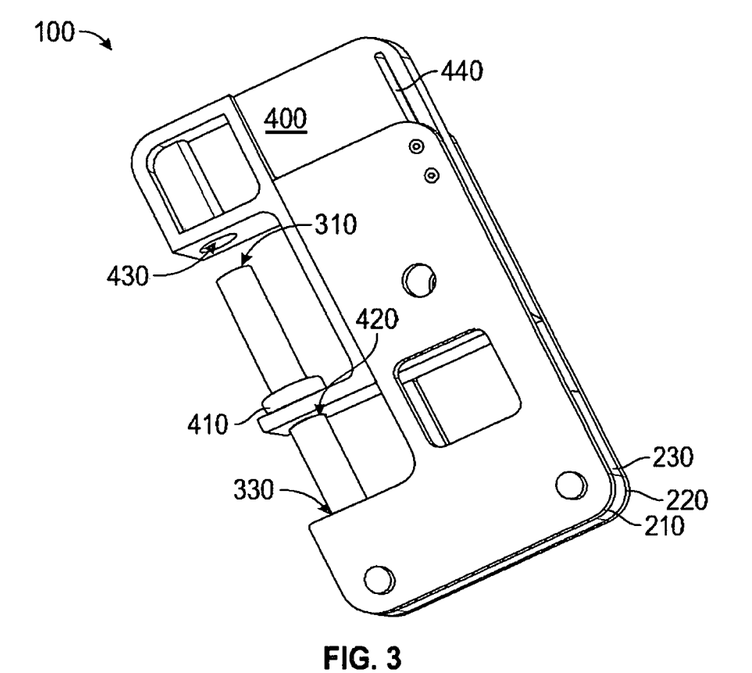
FIG. 3 is a perspective illustration of a lockable housing in its open position.

FIG. 3 is a perspective illustration of a lockable housing 100 in its open position. The shank 300 has a free end 310 and a fixed end 330 that is securely connected to the base portion 200. According to particular embodiments, the fixed end 330 of the shank 300 may be embedded into or otherwise securely connected to the fixed spacer 230. As shown, the sliding portion 400 is generally sized and shaped to slide in and out of the interior space defined by the two panels 210, 220 of the base portion 200. Note, however, that the area of the sliding portion 400 that surrounds the shank window 280 may have a raised area 700, as shown in FIG. 6 and FIG. 7. The raised area 700 may have a thickness that is greater than the thickness of other areas of the sliding portion 400 because the raised area 700 does not slide between the panels 210, 220 of the base portion 200.

As shown in FIG. 3, the sliding portion 400 may include a hole 420 that is sized and shaped to slidably receive the shank 300 therethrough. The sliding portion 400 may also feature a raised rim 410 around the hole 420. The shank 300 may have a fixed end 330 that is connected to the base portion 200 and a free end 310 that is received into a mated opening 430 in the sliding portion 400. The shank 300, as shown, has a length sufficient to span the shank window 280 and enter the mated opening 430 when the housing 100 is closed. The hole or mated opening 430 is sized and shaped to slidably receive the free end 310 of the shank 300 when the portions 400, 200 are slid together and the housing 100 is closed.

The sliding portion 400 may also include a handle 710 to facilitate easy grasping of the sliding portion 400. The handle 710 may be located, for example, where the thumb is positioned in FIG. 2 and FIG. 3. The handle 710 may include an indentation or shallow cavity in the surface of the sliding portion 400 and/or a raised ridge along one or more edges of the sliding portion 400, as shown in the figures.

Figure 4:
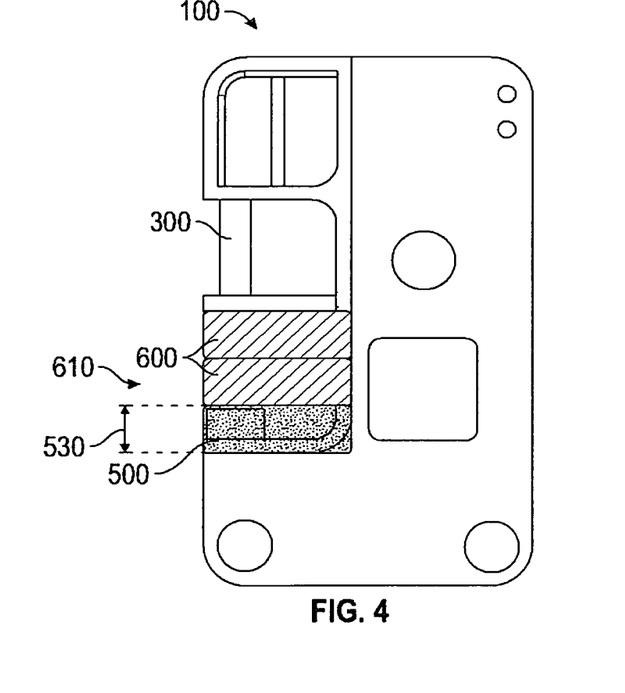
FIG. 4 is a side illustration of a lockable housing with a plurality of spacers positioned along the shank, according to another embodiment.

FIG. 4 is an illustration of a lockable housing 100 with a plurality of spacers positioned along the shank 300, according to another embodiment. The spacers, for example, may include a removeable spacer 500 and one or more incremental spacers 600. The spacer 500 may have a spacer width 530, as shown. The spacers 500, 600 may be sized and shaped to engage with one another—using mating rims and grooves, for example—to form a spacer stack 610 that is positioned along the shank 300. As shown, the spacers 500, 600 cooperate to reduce the effective open space within the shank window 280. Referring to FIG. 1, for example, the shank window 280 is generally elongate and rectangular in shape. In contrast, as shown in FIG. 4, the spacers 500, 600 reduce the effective size of the shank window 280. The smaller effective size impedes the use of bolt cutters, saws, or other devices that may be used by unauthorized persons trying to cut the shank 300. A good example of this is shown in FIG. 5, which shows the shank 300 passing through an opening in a trailer coupler 30. Very little of the shank 300 is visible or accessible because the spacer 500 has narrowed the shank window 280.

FIG. 5 is a perspective illustration of the lockable housing 100 secured by a padlock 10 to a trailer coupler 30, and further showing a cable 20 passing through a supplemental opening 270. As shown, the shank of the padlock 10 passes through the shackle opening 260, thereby securing the base portion 200 to the sliding portion 400. The cable 20, when its ends are locked together, also secures the base portion 200 to the sliding portion 400. Multiple cables, ropes, wires, or other items may be passed through the supplemental opening 270. For example, in an alternative arrangement, the large-diameter shackle of a large padlock may be passed through the supplemental opening 270, thereby securing the base portion 200 to the sliding portion 400 (with or without any first element 10 being placed through the shackle opening 260).

The cable 20 may include its own lock and it may be attached to one or more items of personal property, such as equipment that is stored on or near the trailer. For example, the cable 20 may be locked around a number of items of equipment on the trailer and/or a number of items located near the rear of a vehicle towing the trailer. When the trailer is parked, the cable 20 may be locked around a number of items of personal property, such as bicycles, coolers, gas canisters, vehicles, and watercraft. In this aspect, the supplemental opening 270 allows the user to secure additional property using a single lockable housing 100.

According to other particular embodiments, the lockable housing 100 may be substantially larger (or smaller) than the lockable housing 100 shown in FIG. 5. For example, larger hitch assemblies may require a lockable housing that is several feet in length and width, with a much greater thickness. Moreover, instead of having one supplemental opening 270, the lockable housing 100 may include two or more supplemental openings that may be positioned along the lockable housing at particular locations, may be sized and shaped to accommodate any number of different kinds of security devices (such as chains, cables, and ropes). In this aspect, a lockable housing 100 with two or more supplemental openings, of different sizes and shapes, at different locations along the housing 100, may allow the user to secure a number of different items of property using a single lockable housing 100.

FIG. 6 is a perspective illustration of a lockable housing 100 including a removeable spacer 500 and one or more incremental spacers 600. The spacers 500, 600 may be sized and shaped to engage with one another and may include mating rims and grooves, as shown. The spacers 500, 600 may also include one or more geometric features that are sized and shaped to releasably engage with one or more features on the sliding portion 400 around the shank window 280. For example, as shown, the spacers 500, 600 may include one or more stops or grooves that are sized and shaped to releasably engage with the raised area 700 and/or with a rail element positioned along the edge of the raised area 700. In this aspect, the spacers 500, 600 may be configured to stack securely one another and to snap into place against the lockable housing 100 when correctly positioned for use.

Each of the spacers 500, 600 defines a spacer opening 540 therethrough that is sized and shaped to receive the shank 300. The spacers 500, 600 may be sized in thickness to facilitate placement over the shank 300 when the lockable housing 100 is open, as shown in FIG. 3 and FIG. 7. The spacer opening 540 may be a circular hole (not shown) or, as shown in FIG. 6, a generally U-shaped opening that is sized and shaped to fit around the shank 300. In this aspect, the spacers 500, 600 are sized and shaped such that the walls of the spacer opening 540 will cooperate with the opposing ends of each spacer 500, 600 to releasably secure the spacers 500, 600 within the shank window 280.

Also, the removeable spacer 500 nearest the fixed end 330 of the shank 300 may include an arcuate groove 545 that is sized and shaped to engage with a raised rim 410 that is located around the hole 420 in the sliding portion 400. In this aspect, the groove 545 and the rim 410 provide a stable seat for holding the removeable spacer 500 in place.

FIG. 7 is a perspective illustration a lockable housing 100 in its open position. The sliding portion 400, as shown, may include one or more ribs that are sized, shaped, and positioned inside and/or along the body of the sliding portion 400 to provide stable sliding and overall structural support. For example, the ribs shown in FIG. 7 include a ring-shaped rib around the opening that will correspond to the shackle opening 260. Similarly, the sliding portion 400 may include structural ribs at other locations, including around or near the opening that will correspond to the supplemental opening 270.

Although several embodiments have been described herein, those of ordinary skill in the art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims that follow, such terms are used in a generic and descriptive sense only and should not be construed as limiting the described invention or the claims that follow.

The invention claimed is:

1. A lockable housing, comprising:
a base portion comprising a front panel and an opposing rear panel separated by a fixed spacer and one or more guide pins, said panels defining an interior space that is sized and shaped to slidably receive a sliding portion,
each of said front panel and said rear panel defining a plurality of base openings sized, shaped, and positioned to correspond to one another, said base openings including a shackle opening, a supplemental opening, and a shank window;
said base portion further comprising a shank extending into said shank window, said shank having a free end and a fixed end connected to said base portion;
said sliding portion defining a hole that is sized and shaped to slidably engage with said shank, a mated opening sized and shaped to receive said free end of said shank, and one or more pinways sized and shaped to slidably engage with said one or more guide pins,
said sliding portion defining a plurality of secondary openings each sized, shaped, and positioned to correspond to said base openings when said sliding portion is mated with said base portion,
said shank having a length sufficient to span said shank window and enter said mated opening when said sliding portion is mated with said base portion.

2. The lockable housing of claim 1, wherein said base portion is secured to said sliding portion either when a first element is secured through said shackle opening or when a second element is secured through said supplemental opening.

3. The lockable housing of claim 1, wherein said shank window is generally rectangular in shape, having an open width along a first axis extending generally parallel to said shank and an open depth, said lockable housing further comprising a removable spacer defining a spacer opening that is sized and shaped to receive said shank.

4. The lockable housing of claim 3, wherein said removable spacer comprises a plurality of incremental spacers each similarly sized and shaped to engage with one another in a stack positioned along said shank, said incremental spacers cooperating to define an open space that is smaller in area than said shank window.

5. The lockable housing of claim 2, wherein said first element is a padlock having a body and a shackle, and wherein said shackle opening is sized and shaped to receive said shackle.

6. The lockable housing of claim 2, wherein said second element is a large padlock having a large body and a large shackle, and wherein said supplemental opening is sized and shaped to receive said large shackle.

7. The lockable housing of claim 2, wherein said supplemental opening is generally rectangular and is sized and shaped to receive a second element, wherein said second element is one or more devices selected from the group consisting of cable, chain, rope, wire, cord, line, tape, string, and strap.

8. The lockable housing of claim 3, wherein said removable spacer further defines an arcuate groove sized and shaped to engage with a raised rim around said hole of said sliding portion.

* * * * *